United States Patent Office  3,328,464
Patented June 27, 1967

3,328,464
PHENOXY- AND PHENYLTHIO-PROPANOL-QUATERNARY AMMONIUM COMPOUNDS
Wolfgang Gündel, Dusseldorf-Oberkassel, and Helmut Damm, Dusseldorf-Benrath, Germany, assignors to Dehydag Deutsche Hydrierwerke GmbH, Dusseldorf, Germany, a corporation of Germany
No Drawing. Filed Dec. 10, 1964, Ser. No. 417,497
Claims priority, application Germany, Dec. 14, 1963,
D 43,176
13 Claims. (Cl. 260—567.6)

The present invention relates to novel surface-active quaternary ammonium compounds of the formula

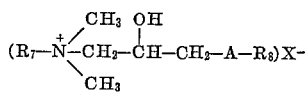

wherein $R_7$ represents a member selected from the group consisting of a monovalent higher molecular weight lipophilic radical; A is a member selected from the group consisting of oxygen and sulfur; $R_8$ represents a monovalent aromatic radical; and X represents the anion of an acid selected from the group consisting of mineral acids and strong organic acids, and to the process of preparing these compounds. The invention also relates to bactericidal compositions containing the surface-active quaternary ammonium compounds.

An object of the present invention is the obtention of novel surface-active compounds of the formula

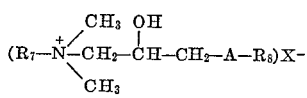

wherein $R_7$ represents a member selected from the group consisting of a monovalent higher molecular weight lipophilic radical; A is a member selected from the group consisting of oxygen and sulfur; $R_8$ represents a monovalent aromatic radical; and X represents the anion of an acid selected from the group consisting of mineral acids and strong organic acids.

Another object of the present invention is the obtention of novel bactericidal compounds of the formula

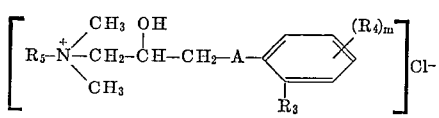

wherein $R_5$ represents a member selected from the group conissting of aliphatic alkyl having from 10 to 14 carbon atoms; A is a member selected from the group consisting of oxygen and sulfur; $R_3$ represents a member selected from the group consisting of lower alkyl, halogen and lower alkoxy; m is an integer selected from the group consisting of 1 to 2; and $R_4$ represents a member selected from the group consisting of hydrogen, halogen and lower alkyl.

A still further object of the present invention is the obtention of novel textile softening and antistatic compounds of the formula

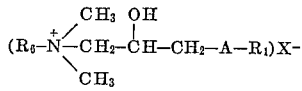

wherein $R_6$ represents a member selected from the group consisting of aliphatic alkyl having from 15 to 18 carbon atoms and aliphatic alkoxy-lower alkyl having from 17 to 21 carbon atoms; A is a member selected from the group consisting of oxygen and sulfur; $R_1$ is a member selected from the group consisting of phenyl, naphthyl, halogen substituted naphthyl, and

where n represents an integer selected from the group consisting of 1 to 3 and $R_2$ is a member selected from the group consisting of alkyl, halogen, alkoxy, phenyl, lower alkyl phenyl; and X represents the anion of an acid selected from the group consisting of mineral acids and strong organic acids.

A yet further object of the present invention is the development of a process for the production of a surface-active quaternary ammonium compound of the formula

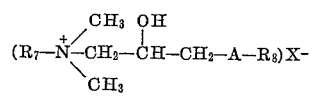

wherein $R_7$ represents a member selected from the group consisting of a monovalent higher molecular weight lipophilic radical; A is a member selected from the group consisting of oxygen and sulfur; $R_8$ represents a monovalent aromatic radical; and X represents the anion of an acid selected from the group consisting of mineral acids and strong organic acids which comprises reacting a tertiary amine of the formula

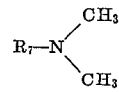

wherein $R_7$ has the above-assigned values with epichlorohydrin in the presence of water and a base-binding agent selected from the group consisting of mineral acids and strong organic acids, said base-binding agent being added at a controlled rate to keep the reaction media approximately neutral, reacting the compound of the formula

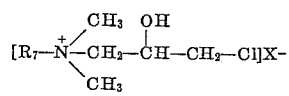

wherein $R_7$ and X have the above-assigned values with a compound of the formula

Me—A—$R_8$ wherein Me represents a monovalent metallic cation and A and $R_8$ have the above-assigned values in the presence of an inert solvent and recovering said surface-active quaternary ammonium compound.

Another object of the present invention is the obtention of a bactericidal composition comprising from about 1 to 99 parts of a bactericidal compound of the formula

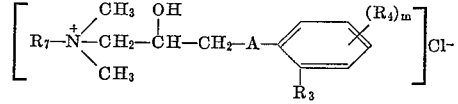

wherein $R_5$ represents a member selected from the group consisting of aliphatic alkyl having from 10 to 14 carbon atoms; A is a member selected from the group consisting of oxygen and sulfur; $R_3$ represents a member selected from the group consisting of lower alkyl, halogen and lower alkoxy; m is an integer selected from the group consisting of 1 to 2; and $R_4$ represents a member selected from the group consisting of hydrogen, halogen and lower alkyl and from about 99 to 1 parts of inert excipients.

A yet further object of the present invention is the development of a process of disinfection which comprises contacting the surface to be disinfected with from about 0.001% to about 1% solution of a bactericidal compound of the formula

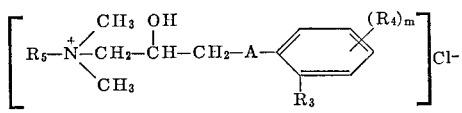

wherein $R_5$ represents a member selected from the group consisting of aliphatic alkyl having from 10 to 14 carbon atoms; A is a member selected from the group consisting of oxygen and sulfur; $R_3$ represents a member selected from the group consisting of lower alkyl, halogen and lower alkoxy; m is an integer selected from the group consisting of 1 to 2; and $R_4$ represents a member selected from the group consisting of hydrogen, halogen and lower alkyl.

These and other objects of the invention will become more apparent as the description thereof proceeds.

It has been discovered that valuable surface-active quaternary ammonium compounds of the formula $$[R_1-\overset{+}{\underset{CH_3}{\underset{|}{N}}}\diagup\overset{CH_3}{\diagdown}CH_2-\overset{OH}{\underset{|}{C}}H-CH_2-A-R_8]X^-$$

wherein $R_7$ represents a member selected from the group consisting of a monovalent higher molecular weight lipophilic radical; A is a member selected from the group consisting of oxygen and sulfur; $R_8$ represents a monovalent aromatic radical; and X represents the anion of an acid selected from the group consisting of mineral acids and strong organic acids, may be prepared in a simple manner and with a good yield if tertiary amines of the general formula

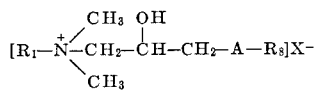

wherein $R_7$ represents monovalent higher molecular weight lipophilic radical, such as a hydrocarbon radical having from 6 to 22, preferably from 10 to 18 carbon atoms, which radical may be straight chained or branched chained, if necessary substituted or interrupted by heteroatoms, are allowed to react with epichlorohydrin in the presence of water and with a controlled addition of a base-binding agent, preferably a mineral acid, in order to maintain the reaction media approximately neutral and thereafter the quaternary salts, occurring from this reaction and corresponding to the general formula

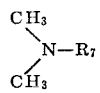

wherein $R_7$ has the meaning indicated above and X represents the anionic radical of the mineral acid used, are reacted with salts of aromatic oxide compounds (phenolates) or aromatic mercapto compounds (mercaptides).

In the example given for the use of N,N-dimethyldodecylamine as aliphatic tertiary amine, of hydrochloric acid as base-binding agent and of sodium phenolate as salt of an aromatic oxide compound, the formation of the process products is accomplished in accordance with the two following reactions Formulae I and II.

(I)

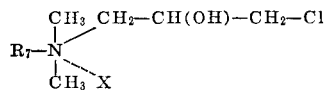

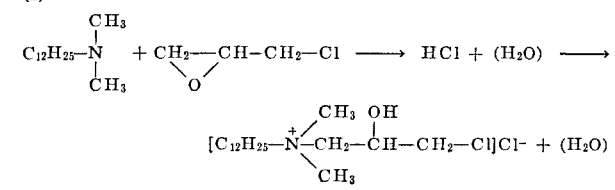

(II)

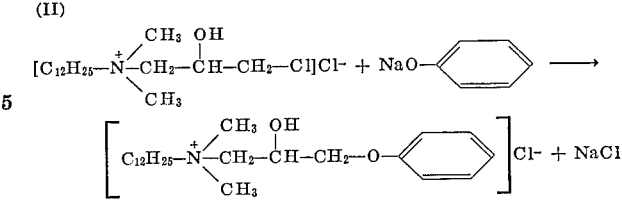

The concomitant use of a base-binding agent in the first process step according to Formula I is necessary in order to avoid formation of the free ammonium bases, which occur in the presence of water primarily from the reaction of the tertiary amine and the epoxide, immediately following their formation as salt, as otherwise the organically bonded chloride will be affected by the alkaline condition and will no longer be at disposal for the further reaction according to Formula II.

In the practice, the most advisable manner of procedure is to suspend the tertiary amine in water, admixing it thoroughly after the addition of all or part of the epichlorohydrin and finally to add slowly dropwise, keeping in step with the progress of the reaction, a sufficient amount of a diluted acid in such proportion that the hyydrogen-ion concentration remains within a pH value of between 7 and 8, and will not exceed the pH value of 8. This working process, which may take according to the reactivity of the tertiary amine from ½ hour to 4 hours, is controlled in a simple manner by the addition of a suitable color indicator, for example phenol-phthalein or better yet by the installation of an electrometrically metering electrode. The working temperature for this operation does as a rule not exceed 50° C. It is advisable to start the exothermic reaction at room temperature and to eliminate the released heat only to the extent that the temperature of the reaction mixture remains at 40–50° C. until the addition has been completed.

The quantity of water to be used here may vary within wide ranges and may for example amount to 20–90% of the entire reaction mixture. In general it is advisable to work in such a manner that the water content of the reaction product including the amount of water introduced with the acid is between 50–80% of the total amount of the reaction mixture. The amount of water required is related essentially to the viscosity of the reaction solution and it is generally required in larger proportion as the alkyl chain of the dimethylalkylamine utilized is lengthened.

The reaction has been completed and conducted correctly when, after introducing the stoichiometric amount of base-binding agent, the pH value has not been shifted into the acid range and all of the amine has been clearly dissolved. Its completion can further be ascertained when a sample taken therefrom and alkalinized does not give a deposit of unreacted amine.

In some cases it may be advisable to utilize a portion, that is about 10–40% of the base-binding agent required together with the tertiary amine, for example, by introducing a portion of the amine as its salt into the reaction mixture. By this measure the hydrogen ion concentration is adjusted at the beginning of the reaction and the reaction is easier to control, as the amount of the free tertiary amine is reduced and only in proportion to the reaction is further tertiary amine released by subsequent neutralization.

When the higher molecular weight tertiary amines are utilized, this procedure has the further advantage in that the reactants are in a homogenous phase, as such tertiary amines are considerably more soluble in a concentrated aqueous solution of their own salts and therefore the reactants are available from the beginning of the reaction.

According to the second process step, which is usually performed without isolation of the intermediate products, an equivalent amount of an aromatic hydroxy or mercapto compound and the corresponding equivalent amount of an alkali metal hydroxide, such as sodium or potassium hydroxide is added to the reacted mixture for the purpose of conversion into the quaternary salts of the invention. In many cases it is advisable to dilute the oxide or mercapto compound first in the hydroxide solution and to introduce this solution into the reaction medium which has been previously heated to about 80 to 90° C. The substitution of the organically bonded chloride atom by the aryloxy or arylmercapto radical occurs at this temperature rapidly and completely. The reaction is finished as a rule after 4 to 8 hours when the mixture does no longer give an alkaline reaction. The temperature of the reaction however can vary from about 50° C. to the reflux temperature.

The second step of the reaction, the addition of the aromatic hydroxide or thiol to the intermediate quaternary ammonium compound according to Reaction II is conducted in the presence of an inert solvent. The reaction can be conducted in the aqueous reaction medium obtained from the first step, or it is also possible to isolate the quaternary ammonium intermediate compound by evaporation of the water and subsequent recrystallization. The crystalline quaternary ammonium intermediate compound may then be dissolved in an inert solvent such as water or an organic solvent such as a lower alkanol or acetone. The aromatic hydroxy or mercapto compound can be added to this solution in the form of its solid alkaline salt, preferably the alkali metal salt, such as the sodium salt. If an organic solvent is utilized, this procedure results in a solution of the final product from which the insoluble by-product inorganic salt formed is easier separated.

For the isolation of the process products, which in some cases are partly separated already during the reaction, the entire reaction product can appropriately be evaporated to dryness and the residue dissolved in an organic solvent which leaves the inorganic chloride salt, formed simultaneously, undissolved, for this purpose above all lower ketones, in particular acetone, have proved suitable. The desired product is then crystallized from the purified solution.

The process according to the invention is very generally applicable insofar as the most varied tertiary amines as well as the most varied phenols or thiophenols may be employed as starting materials.

As higher molecular tertiary amines the following are preferred:

N,N - dimethylhexylamine, N,N - dimethyloctylamine, N,N - dimethyldecylamine, N,N - dimethyldodecylamine, N,N - dimethyltetradecylamine, N,N-dimethylhexadecylamine, N,N-dimethyloctadecylamine including mixtures of such dimethyl fatty amines as they are obtained at the methylation of, for instance, a coconut oil or solid fatty amine mixture. Also, such N,N-dimethylalkylamines may be used whose alkyl radicals are branched or contain heteroatoms, as for instance N,N-dimethyl-2-ethylhexylamine, N,N - dimethyl - 1-methylundecylamine, N,N-dimethyl-2-ethyldodecylamine, N,N-dimethyl-3-dodecyloxypropylamine, N,N-dimethyl-3-octadecyloxy-propylamine, etc. Instead of the aliphatic higher molecular radicals above indicated, the tertiary amines may contain other known higher molecular weight lipophilic radicals as for instance arylalkyl radicals, such as alkylbenzyl radicals, cycloalkyl-alkyl radicals and others.

With regard to the type of aromatic hydroxy or mercapto compounds utilized, the process may be adapted for ever so many variations insofar as mono as well as poly nuclear compounds are operable, including those whose nuclei are substituted by alkylaryl-, aralkyl-, alkyloxy radicals or halogen atoms as, for example: phenol, 2-chlorophenol, 4 - chlorophenol, 2,4 - dichlorophenol, 2,4,5 - trichlorophenol, 2,4,6 - trichlorophenol, 4 - bromophenol, 2,4,6 - tribromophenol, 2-cresol, 3-cresol, 4-cresol, 4 - chloro - 2 - cresol, 2 - chloro - 4 - cresol, 4,6-dichloro-2-cresol, 2,6 - dichloro - 4 - cresol, 2-ethylphenol, 2-butylphenol, 4-tert.-butylphenol, 4 - isohexylphenol, 4- isononylphenol, 4 - dodecylphenol, 3,4-, 2,4- or 3,5-dimethylphenol (xylenols), 2,3,5- or 2,4,6 - trimethylphenol (cumenols); furthermore aromatic substituted phenols, such as 2-phenylphenol, 4 - phenylphenol, 4 - phenoxyphenol, 4 - chloro - 2 - phenylphenol, 2-chloro-4-phenylphenol, 2 - chloro - 4 - benzylphenol, 2-benzylphenol, 4-benzylphenol; 1-naphthol, 2 - naphthol, 2-chloro-1-naphthol, 1-chloro-2-naphthol; and the related mercapto compounds, such as thiophenol, 1-thionaphthalene, 2-thionaphthalene, etc.

As base-binding agents, aside from other customary mineral acids, hydrochloric and sulfuric acid are primarily preferable. In some cases, strong organic acids such as p-toluenesulfonic acid and similar ones, may be used.

The compounds of the invention of the formula

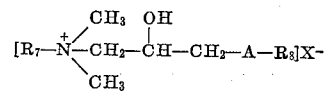

wherein $R_7$ represents a member selected from the group consisting of a monovalent higher molecular weight lipophilic radical; A is a member selected from the group consisting of oxygen and sulfur; $R_8$ represents a monovalent aromatic radical; and X represents the anion of an acid selected from the group consisting of mineral acids and strong organic acids, are surface-active quaternary ammonium compounds. Particularly preferred from among these compounds are the surface-active quaternary ammonium compounds of the formula

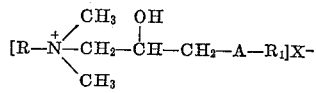

wherein R is a member selected from the group consisting of alkyl having 6 to 22 carbon atoms, alkenyl having from 6 to 22 carbon atoms, alkoxy-lower alkyl having from 8 to 22 carbon atoms; A is a member selected from the group consisting of oxygen and sulfur; $R_1$ is a member selected from the group consisting of phenyl, naphthyl, halogen substituted naphthyl and

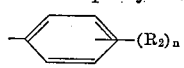

where $n$ represents an integer selected from the group consisting of 1 to 3 and $R_2$ is a member selected from the group consisting of alkyl, halogen, alkoxy, phenyl, lower alkyl phenyl; and X represents the anion of an acid selected from the group consisting of mineral acids and strong organic acids, wherein the higher molecular weight lipophilic radical attached to the nitrogen atom is aliphatic. These N,N- dimethyl - N - alkyl - N - [3-aryloxy-(or 3-arylthio) - 2 - hydroxypropyl] - ammonium salts are water soluble, colorless, well crystallizing compounds which possess generally specific melting points. Compounds whose alkyl radicals comprising more than 14 carbon atoms of the formula

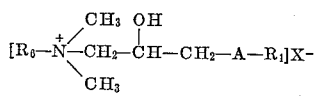

wherein $R_6$ represents a member selected from the group consisting of aliphatic alkyl having from 15 to 18 carbon atoms and aliphatic alkoxy-lower alkyl having from 17 to 21 carbon atoms; A is a member selected from the group consisting of oxygen and sulfur; $R_1$ is a member selected from the group consisting of phenyl, naphthyl, halogen substituted naphthyl, and

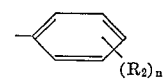

where $n$ represents an integer selected from the group consisting of 1 to 3 and $R_2$ is a member selected from the group consisting of alkyl, halogen, alkoxy, phenyl, lower alkyl phenyl; and X represents the anion of an acid selected from the group consisting of mineral acids and strong organic acids, may be used as softening agents for textiles and as preventatives for the accumulation of electrostatic charge on the textile or textile yarns. Compounds whose alkyl chains contain preferably from 12 to 14 carbon atoms possess properties of more or less markedly bactericidal effect, whose extent and effectiveness is determined also by the substitution in the aromatic nucleus. The bactericidal effect attains, as it was discovered, optimal values, when the aromatic ring carries in the ortho position a halogen atom or an alkyl or alkyloxy radical. In particular compounds of the formula

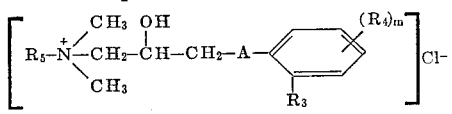

wherein $R_5$ represents a member selected from the group consisting of aliphatic alkyl having from 10 to 14 carbon atoms; A is a member selected from the group consisting of oxygen and sulfur; $R_3$ represents a member selected from the group consisting of lower alkyl, halogen and lower alkoxy; $m$ is an integer selected from the group consisting of 1 to 2; and $R_4$ represents a member selected from the group consisting of hydrogen, halogen and lower alkyl, exceed the bactericidal effect of known products presently on the market with reference in particular to *Staphylococcus aureus* and *Bacillus proteus*.

Disinfectants can be prepared from the above bactericidal compounds according to known methods. In the case of liquid disinfectants the compounds can be dissolved in water and/or organic therapeutically inert solvents such as isopropanol. The concentration of active ingredient is adjusted to from about 1 part to about 50 parts by weight depending on the solubility of the active compound. The disinfectant is utilized by applying an amount of from 0.001% to about 1% of active compound to the surface to be disinfected.

It is obvious that other therapeutically inert ingredients such as coloring agents, wetting agents, etc. may also be incorporated in the disinfectants. Also other therapeutically active materials may be included.

Solid disinfectant preparations may also be prepared utilizing from about 1 part to about 99 parts by weight of the active compound and from about 99 parts to about 1 part of solid inert excipients such as wetting agents, soaps, alkaline builders, etc.

The following examples are illustrative of the invention. They are not to be deemed limitive in any respect however and other expedients known to those skilled in the art may be employed.

EXAMPLE I

*N-dodecyl-N,N-dimethyl-N-(3-phenoxy-2-hydroxy-propyl)-ammonium chloride*

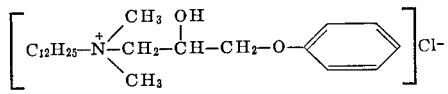

125 parts by volume of water, 53.25 parts by weight of dimethyldodecylamine (0.25 mol) and 23.25 parts by weight of epichlorohydrin (0.25 mol) were placed in a three-necked flask provided with stirrer, thermometer, drip burette and electrometric pH measuring device. As soon as the slowly rising pH value of the vigorously stirred mixture exceeded the value of 7.5, which usually is the case already after a short period, the addition of a 20% hydrochloric acid solution was started. This acid solution was continuously added corresponding to the progressing of the reaction, in such manner than the pH value of the reaction mixture never exceeded the value of 7.8. Provided this operation was conducted conscientiously, it was possible to add, within one hour, 0.25 mol of hydrochloric acid, being 45.6 parts by weight, corresponding to 41.5 parts by volume of the 20% hydrochloric acid solution, without the pH value passing into the acid range. The temperature, which during the process slowly rose, was held at 45° C., at which temperature the solution was stirred for a further hour after the addition of the acid had been completed.

To the now clear and homogeneous solution, a solution of 23.5 parts by weight of phenol (0.25 mol) in 125 parts by volume of two normal sodium hydroxide solution was added. The reaction mixture was heated to a temperature of 85° C., while stirring for 4 hours. The dry residue containing the sodium chloride formed, obtained subsequent to the evaporation of the water, was dissolved in 600 parts by volume of acetone. A small amount of active carbon was added thereto and the solution was filtered. The clear filtrate was allowed to crystallize and 63 parts by weight of pure N-dodecyl-N,N-dimethyl-N-(3-phenoxy-2-hydroxy-propyl)-ammonium chloride were obtained, which corresponded to a yield of 63% of the theory. Its melting point was 99.5–101° C.

EXAMPLE II

*N-dodecyl-N,N-dimethyl-N-[3-(2'-cresyloxy)-2-hydroxy-propyl]-ammonium chloride*

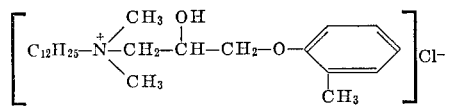

By closely following the procedures given in Example I, but by using 27.0 parts by weight of o-cresol (0.25 mol) instead of phenol, 57 parts by weight of N-dodecyl-N,N - dimethyl - N-[3-(2'-cresyloxy)-2-hydroxypropyl]-ammonium chloride were obtained by the recrystallization of the dry residue from 560 parts by volume of acetone, which corresponded to a yield of 55.1% of theory. The melting point was 108–109° C.

EXAMPLE III

*N-dodecyl-N,N-dimethyl-N-[3-(2'-chlorophenoxy)-2-hydroxy-propyl]-ammonium chloride*

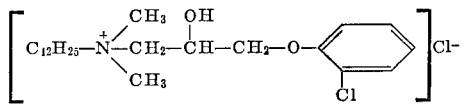

By following the procedures given in Example I, but by using 31.1 parts by weight of o-chlorophenol (0.25 mol) instead of phenol, 75 parts by weight of N-dodecyl-N,N - dimethyl - N - [3-(2'-chlorophenoxy)-2-hydroxypropyl]-ammonium chloride were obtained after the crystallization of the dry residue from 500 parts by volume of acetone. Its melting point was 109–110° C. and the yield corresponded to 69.1% of theory.

EXAMPLE IV

*N-dodecyl-N,N-dimethyl-N-[3-(2',4'-dichlorophenoxy)-2-hydroxy-propyl]-ammonium chloride*

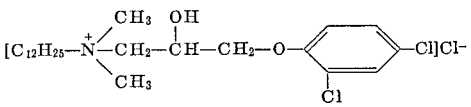

By following the procedures given in Example I, but by using 41 parts by weight of 2,4-dichlorophenol (0.25 mol) instead of phenol, 58 parts by weight of N-dodecyl-N,N - dimethyl-N-[3-(2',4'-dichlorophenoxy)-2-hydroxypropyl]-ammonium chloride were obtained after the crystallization of the residue on evaporation from 500 parts by volume of acetone. Its melting point was 123–124° C., and the yield corresponded to 49.6% of the theory.

EXAMPLE V

*N-dodecyl-N,N-dimethyl-N-[3-(2',4',5'-trichlorophenoxy)-2-hydroxy-propyl]-ammonium chloride*

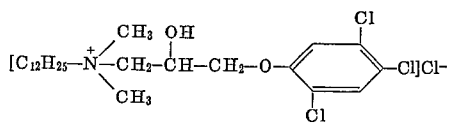

By using, while following the procedure of Example I, 49.3 parts by weight of 2,4,5-trichlorophenol (0.25 mol) instead of phenol, a dry residue was obtained after evaporization of the water, which could be crystallized after an acetone extraction from a Soxhlet apparatus. Thus, 64 parts by weight of pure N-dodecyl-N,N-dimethyl-N-[3 - (2',4',5' - trichlorophenoxy)-2-hydroxypropyl]-ammonium chloride were obtained, having a melting point of 145–145.5° C. and corresponding to a yield of 57.3% of the theory.

EXAMPLE VI

*N-dodecyl-N,N-dimethyl-N-(3-phenylthio-2-hydroxy-propyl)-ammonium chloride*

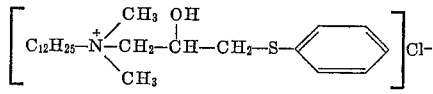

When a solution, prepared according to Example I containing 0.25 mol of N-dodecyl-N,N-dimethyl-N-(3-chloro-2-hydroxy-propyl)-ammonium chloride, was reacted with 27.5 parts by weight of thiophenol (0.25 mol) dissolved in 125 parts by volume of a 2-N-sodium hydroxide solution, a dry residue was obtained after a reaction period of 6 hours which, crystallized from 600 parts by volume of acetone, produced 70.5 parts by weight of N-dodecyl-N,N - dimethyl - N-(3-phenylthio-2-hydroxy-propyl)-ammonium chloride, which amount corresponded to a yield of 67.7% of theory. The melting point was 121 to 121.5° C.

EXAMPLE VII

*N-3-(dodecyloxy)-propyl-N,N-dimethyl-N-[3-(4'-chlorophenoxy)-2-hydroxy-propyl]-ammonium chloride*

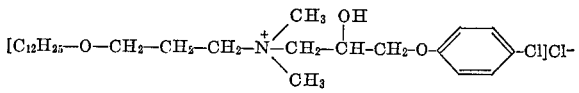

23.25 parts by weight (0.25 mol) of epichlorohydrin were added to a vigorously stirred suspension of 67.8 parts by weight of N,N-dimethyl-3-(dodecyloxy)-propylamine (0.25 mol) and 200 parts by volume of water. As soon as the continuously measured pH value showed an increase of the alkalinity, a dropwise addition of a 20% hydrochloric acid solution was started. Altogether, 41.5 parts by volume of the 20% hydrochloric acid solution were added over a period of several hours in such manner that the pH value remained between 7 and 7.5. To the now clear mixture, a solution of 23.15 parts by weight of p-chlorophenol (0.25 mol) in 100 parts by weight of a 10% sodium hydroxide solution (0.25 mol) was added. The reaction mixture was heated to 90° C. over a period of 7 hours. The dry residue obtained after the evaporation of the water was dissolved in isopropanol to eliminate the sodium chloride, and subsequently filtered. The residue on evaporation of this solution crystallized when it was left at rest for some time and could be recrystallized from a four-fold to five-fold volume of acetone. 49 parts by weight of N-3-(dodecyloxy)-propyl-N,N-dimethyl-N-[3 - (4' - chlorophenoxy)-2-hydroxy-propyl]-ammonium chloride were obtained, having a melting point of 90–92° C.

EXAMPLE VIII

*N-hexadecyl-N,N-dimethyl-N-[3-(2',4',6'-trichlorophenoxy)-2-hydroxy-propyl]-ammonium chloride*

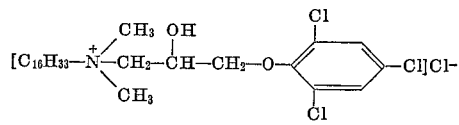

23.25 parts by weight of epichlorohydrin (0.25 mol) were added to a vigorously stirred suspension of 67.25 parts by weight of dimethylhexadecylamine (0.25 mol) and 300 parts by volume of water. As soon as the reaction commenced, altogether 41.5 parts by volume of a 20% hydrochloric acid solution (0.25 mol) were added dropwise under constant control of the pH value, as it has been described in the preceding examples. To the now clear, aqueous solution containing 0.25 mol of N-hexadecyl - N,N - dimethyl-N-3-chloro-2-hydroxy-propyl-ammonium chloride, 49.4 parts by weight of 2,4,6-trichlorophenol (0.25 mol) dissolved in 125 parts by volume of an 8% sodium hydroxide solution (0.25 mol) were added. The reaction mixture was heated to 90° C. under steady stirring for a period of 10 hours. The dry residue formed after the evaporation of the water was dissolved in 500 parts by volume of warm acetone. The undissolved sodium chloride was filtered off, and N-hexadecyl-N,N-dimethyl - N - [3-(2',4',6'-trichlorophenoxy)-2-hydroxy-propyl]-ammonium chloride was isolated by evaporizing the acetone. The yield was excellent. For purposes of purification, the salt was recrystallized from a threefold volume of ethyl acetate. The melting point was 105–107° C.

EXAMPLE IX

*N-dodecyl-N,N-dimethyl-N-[3-(2'-phenyl-phenoxy)-2-hydroxy-propyl]-ammonium chloride*

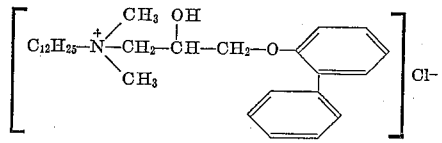

By operating according to the procedures given in Example I, but by using 42.5 parts by weight of 2-phenylphenol (0.25 mol) instead of phenol, a dry residue which slowly solidified in the cold was obtained after the distillation of the water. This residue was recrystallized from a fourfold amount (530 parts by weight) of acetone after filtering to eliminate the simultaneously formed sodium chloride. In this way, 67.8 parts by weight of N-dodecyl-N,N - dimethyl - N - [3-(2'-phenyl-phenoxy)-2-hydroxy-propyl]-ammonium chloride were obtained, corresponding to a yield of 57% of the theory. After a further recrystallization from acetone, the quaternary ammonium salt had a melting point of 106–107° C.

EXAMPLE X

*N-dodecyl-N,N-dimethyl-N-[3-(2'-naphthoxy)-2-hydroxy-propyl]-ammonium chloride*

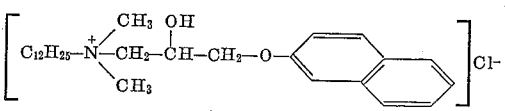

In accordance with the procedures of Example I, a solution of 36.0 parts by weight of 2-naphthol (0.25 mol) in 319 parts by volume of a 3% sodium hydroxide solution (0.25 mol) was added to a solution of 0.25 mol of N - dodecyl - N,N-dimethyl-N-(3-chloro-2-hydroxy-propyl)-ammonium chloride [prepared as in Example I from 53.25 parts by weight of dimethyldodecylamine (0.25 mol), 23.25 parts by weight of epichlorohydrin (0.25 mol), 125 parts by volume of water and 41.5 parts by volume of a 20% hydrochloric acid solution (0.25 mol)].

The reaction mixture was heated to 85–90° C. while stirring for several hours, until the alkaline reaction had disappeared. The residue, present after the evaporation of the water, was dissolved in three volumes of acetone, and after separation of the sodium chloride the solution was left to crystallize under refrigeration. 62 parts by weight of N - dodecyl-N,N-dimethyl-N-[3-(2'-naphthoxy)-2-hydroxy-propyl]-ammonium chloride were obtained corresponding to a yield of 55.2% of theory. The salt could be additionally purified by recrystallization from a tenfold volume of acetone or from a twentyfold volume of water. It has a melting point of 126–127° C.

EXAMPLE XI

*N-tetradecyl-N,N-dimethyl-N-[3-(1'-naphthoxy)-2-hydroxy-propyl]-ammonium chloride*

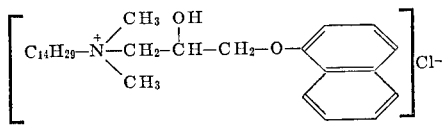

By following the procedures of Example I, using 60.5 parts by weight of dimethyltetradecylamine (0.25 mol) instead of dimethyldodecylamine, and using 36.0 parts by weight of 1-naphthol instead of phenol, a reaction solution was obtained after heating at 85° C. over a period of 8 hours, from which solution the formed N-tetradecyl-N,N - dimethyl-N-[3-(1'-naphthoxy)-2-hydroxy-propyl]-ammonium chloride was separated to a far extent and having a crystalline appearance at the cooling process. The salt, obtained with a most favorable yield, was vacuum filtered, dried and, using a decolorizing carbon, recrystallized from 650 parts by volume of acetone. To purify the salt further, it could be recrystallized, if necessary, from water or from a small amount of isopropanol. The melting point was 132–134° C.

EXAMPLE XII

*N-dodecyl-N,N-dimethyl-N-[3-(2'-methoxy-phenoxy)-2-hydroxy-propyl]-ammonium chloride*

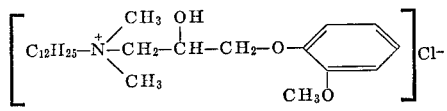

Following the procedures of Example I, 106.5 parts by weight of dimethyldodecylamine (0.5 mol) in the presence of 250 parts by volume of water were reacted with 46.5 parts by weight of epichlorohydrin (0.5 mol) gradually adding 83 parts by volume of a 20% hydrochloric acid solution (0.5 mol). The clear solution thus obtained was evaporated to dryness, and the residue was recrystallized from 400 parts by volume of acetone.

85.5 parts by weight of the N-dodecyl-N,N-dimethyl-N-(3-chloro-2-hydroxy-propyl)-ammonium chloride (0.25 mol) thus obtained were dissolved in 250 parts by volume of water. 31.0 parts by weight of guaiacol (0.25 mol), dissolved in 125 parts by volume of two normal sodium hydroxide solution, were added to the solution which was then heated to 90° C. over a period of 8 hours under constant stirring. The dry residue of the reaction solution was separated from the sodium chloride which occurred simultaneously by redissolving it in alcohol. The residue was admixed, after evaporating the alcohol, with 350 parts by volume of ether, at which time the formed N-dodecyl-N,N-dimethyl-N-[3-(2'-methoxyphenoxy)-2-hydroxypropyl]-ammonium chloride became crystalline in appearance. For purpose of purifying, the product was recrystallized from the 1½ fold an amount of acetone. Thus, 35 parts by weight, corresponding to a yield of 32.6%, of colorless, highly water soluble, hygroscopic crystals were obtained, easily soluble in most of the organic solvents.

EXAMPLE XIII

*N-dodecyl-N,N-dimethyl-N-[3-(2'-phenyl-phenoxy)-2-hydroxy-propyl]-ammonium chloride*

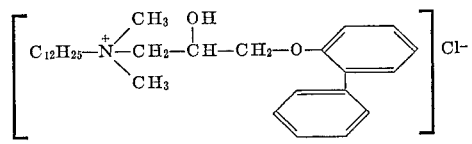

Following the procedures of Example I, 53.25 parts by weight of dimethyldodecylamine (0.25 mol) in the presence of 125 parts by volume of water were reacted with 23.25 parts by weight of epichlorohydrin (0.25 mol) while slowly adding 41.5 parts by volume of a 20% hydrochloric acid solution (0.25 mol). The clear solution was evaporated to dryness and the residue was recrystallized from 200 parts by volume of acetone.

85.5 parts by weight of the thus obtained, crystalline N - dodecyl-N,N - dimethyl-N - (2-hydroxy - 3 - choloropropyl)-ammonium chloride (0.25 mol) were reacted in 600 parts by volume of ethanol with 48.0 parts by weight of sodium 2-phenyl-phenolate (0.25 mol) by heating at reflux for a period of 8 hours.

The residue of N-dodecyl-N,N-dimethyl-N-[3-(2'-phenyl-phenoxy)-2-hydroxy-propyl]-ammonium chloride, remaining after isolating the sodium chloride and after evaporizing the ethanol, was recrystallized from acetone or ethyl acetate, resulting in a yield of 57.5% of the theory. The melting point was 106° C.

EXAMPLE XIV

*N-dodecyl-N,N-dimethyl-N-[3-(2'-benzyl-4'-chlorophenoxy)-2-hydroxy-propyl]-ammonium chloride*

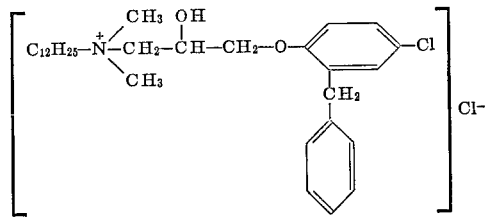

Under the same conditions as specified in Example I, 106.5 parts by weight of dimethyldodecylamine (0.5 mol) in the presence of 250 parts by volume of water were reacted with 46.5 parts by weight of epichlorohydrin (0.5 mol) while slowly adding 83 parts by volume of a 20% hydrochloric acid solution (0.5 mol). The clear solution obtained was evaporated to dryness and the residue was recrystallized from 400 parts by volume of acetone.

To a solution of 5.75 parts by weight of sodium (0.25 mol) in 250 parts by volume of isopropanol, first a solution of 54.6 parts by weight of 2-benzyl-4-chlorophenol (0.25 mol) in 200 parts by volume of isopropanol and then a solution of 85.5 parts by weight of the N-dodecyl-N,N-dimethyl-N-(2-hydroxy-3 - chloropropyl) - ammonium chloride (0.25 mol), as obtained above, in 200 parts by volume of isopropanol was added. After heating at reflux over a period of 8 hours the solution was neutralized with a small amount of alcoholic hydrochloric acid. The sodium chloride formed was filtered off and the alcohol was eliminated. The remaining residue was recrystallized from an eightfold amount of ethyl acetate. 95 parts by weight of N-dodecyl-N,N-dimethyl-N-[3-(2'-benzyl - 4'-chlorophenoxy)-2-hydroxy-propyl]-ammonium chloride were obtained with a yield of 72.6% of theory. The melting point was 88–89° C.

EXAMPLE XV

*Bactericidal activity of the $C_{12-14}$ alkyl quaternary ammonium salts*

The bactericidal activity in vitro of various bactericidal compounds of the formula

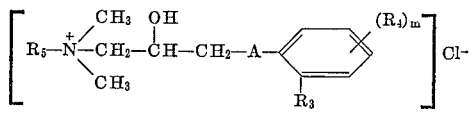

wherein $R_5$ represents a member selected from the group consisting of aliphatic alkyl having from 10 to 14 carbon atoms; A is a member selected from the group consisting of oxygen and sulfur; $R_3$ represents a member selected from the group consisting of lower alkyl, halogen and lower alkoxy; $m$ is an integer selected from the group consisting of 1 to 2; and $R_4$ represents a member selected from the group consisting of hydrogen, halogen and lower alkyl, was determined according to customary methods with respect to suspension cultures of *Staphylococcus aureus* and *Bacillus proteus* by addition of the bactericide at the levels indicated to a secondary culture medium of culture broth containing 3% of "Tween" (a non-ionic wetting agent) and 0.3% of lecithin. The growth response was determined at various intervals as indicated in the following tables.

TABLE I.—BACTERICIDAL ACTIVITY AGAINST *STAPHYLOCOCCUS AUREUS*

| Active Substance | Bactericide Concentration | Action Time in Minutes | | | | | | |
|---|---|---|---|---|---|---|---|---|
| | | 0.5 | 1.0 | 2.5 | 5.0 | 10 | 15 | 20 |
| Product according to Example II: $R_5=C_{12}H_{25}$, $A=O$, $R_3=CH_3$, $R_4=H$ | 1:25,000 | + | − | − | − | − | − | − |
| Product according to Example III: $R_5=C_{12}H_{25}$, $A=O$, $R_3=Cl$, $R_4=H$ | 1:25,000 | + | − | − | − | − | − | − |
| Product according to Example VI: $R_5=C_{12}H_{25}$, $A=S$, $R_1=$phenyl | 1:25,000 | + | − | − | − | − | − | − |
| Comparison Product A | 1:25,000 | + | + | + | − | − | − | − |
| Comparison Product B | 1:25,000 | + | + | + | − | − | − | − |
| Comparison Product C | 1:25,000 | + | + | + | + | − | − | − |

In the table:
+=growth; (+)=retarded growth; −=no growth.
Comparison Product A: alkyl ($C_{12}/C_{14}$)-dimethyl-benzyl-ammonium chloride.
Comparison Product B: dodecyl-dimethyl-(3,4-dichloro-benzyl)-ammonium chloride.
Comparison Product C: (p-tertiary-octylphenoxy-ethoxyethyl)-dimethyl-benzyl-ammonium chloride.

TABLE II.—BACTERICIDAL ACTIVITIES AGAINST *BACILLUS PROTEUS*

| Active Substance | Bactericide Concentration | Action Time in Minutes | | | | | | |
|---|---|---|---|---|---|---|---|---|
| | | 0.5 | 1.0 | 2.5 | 5.0 | 10 | 15 | 20 |
| Product according to Example II: $R_5=C_{12}H_{25}$, $A=O$, $R_3=CH_3$, $R_4=H$ | 1:500 / 1:1,000 | (+) / − | − | − | − | − | − | − |
| Product according to Example III: $R_5=C_{12}H_{25}$, $A=O$, $R_3=Cl$, $R_4=H$ | 1:500 / 1:1,000 | − / − | − | − | − | − | − | − |
| Product according to Example VI: $R_5=C_{12}H_{25}$, $A=S$, $R_1=$phenyl | 1:500 / 1:1,000 | − / − | − | − | − | − | − | − |
| Comparison Product A | 1:500 / 1:1,000 | − / + | + | + | − | − | − | − |
| Comparison Product B | 1:500 / 1:1,000 | − / + | + | + | + | + | + | + |
| Comparison Product C | 1:500 / 1:1,000 | + / + | − | − | − | − | − | − |

In the table:
+=growth; (+)=retarded growth; −=no growth.
Comparison Product A: alkyl ($C_{12}/C_{14}$)-dimethyl-benzyl-ammonium chloride.
Comparison Product B: dodecyl-dimethyl-(3,4-dichloro-benzyl)-ammonium chloride.
Comparison Product C: (p-tertiary-octylphenoxy-ethoxyethyl)-dimethyl-benzyl-ammonium chloride.

EXAMPLE XVI

Of the bactericidal products prepared according to the invention, those prepared according to Examples II, III and VI possess the highest bactericidal effectiveness. A disinfectant may be prepared from 25 parts by weight of N-dodecyl-N,N-dimethyl - N - [3-(2'-cresoxy)-2-hydroxy-propyl]-ammonium chloride of Example II by dissolving same in a warm admixture of 10 parts by weight of isopropanol and 65 parts of distilled water, this solution being diluted to a 0.1 to 0.4% concentration as the working disinfectant. Corresponding disinfectant compositions may be prepared by using N-dodecyl-N,N-dimethyl-N-[3-(2'-chlorophenoxy)-2-hydroxy-propyl] - ammonium chloride of Example III and N-dodecyl-N,N-dimethyl-N-(3-phenylthio-2-hydroxy-propyl)-ammonium chloride of Example VI.

The three compounds named are excellent disinfectants and when compounded by dissolving in quantities of 10 parts by weight in a mixture of 3 parts by weight of an oxyethylated nonyl phenol, which is oxyethylated with 10 mols of ethylene oxide and 87 parts by weight of distilled water to give a disinfectant with simultaneous moistening and purifying effect.

The products named are suitable also for the preparation of solid disinfectant compositions. These compositions, for example, comprise 10–20 parts by weight of the quaternary ammonium compound, 5–10 parts by weight of an oxyethylated nonyl phenol, oxyethylated with 10 mols of ethylene oxide, 25–35 parts by weight of sodium tripolyphosphate, 5–15 parts by weight of acid sodium pyrophosphate, 3–5 parts by weight of sodium metasilicate and 52–15 parts by weight of sodium carbonate.

Other bactericidal compositions can be prepared according to known processes as is well understood in the art.

The preceding specific embodiments are illustrative of the present invention. It is to be understood however that other expedients known to those skilled in the art may be employed without departing from the spirit of the invention or the scope of the appended claims.

We claim:

1. A surface-active quaternary ammonium compound of the formula

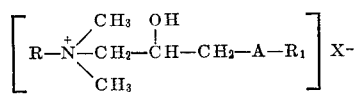

wherein R is a member selected from the group consisting of alkyl having 6 to 22 carbon atoms, alkenyl having from 6 to 22 carbon atoms, alkoxy-lower alkyl having from 8 to 22 carbon atoms; A is a member selected from the group consisting of oxygen and sulfur; $R_1$ as a member selected from the group consisting of naphthyl, dihalogen substituted phenyl, trihalogen substituted phenyl, halogen substituted naphthyl and

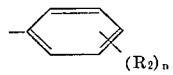

where $n$ represents an integer selected from the group consisting of 1 to 3, $R_2$ is a member selected from the group consisting of lower alkoxy, phenyl and lower alkylphenyl, and where halogen is selected from the group consisting of chlorine and bromine; and X represents the anion of an acid selected from the group consisting of hydrochloric acid, sulfuric acid and p-toluene sulfonic acid.

2. A compound of the formula

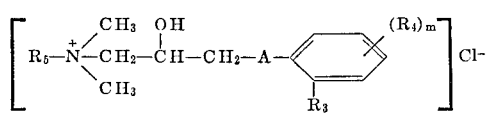

wherein $R_5$ represents a member selected from the group consisting of straight chain alkyl having from 10 to 14 carbon atoms; A is a member selected from the group consisting of oxygen and sulfur; $R_3$ represents a member selected from the group consisting of halogen and lower alkoxy; $m$ is an integer selected from the group consisting of 1 to 2; and $R_4$ represents a member selected from the group consisting of halogen and lower alkyl.

3. A compound of the formula

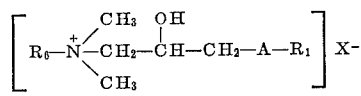

wherein $R_6$ represents a member selected from the group consisting of straight chain alkyl having from 15 to 18 carbon atoms and straight chain alkoxy-lower alkyl having from 17 to 21 carbon atoms; A is a member selected from the group consisting of oxygen and sulfur; $R_1$ is a member selected from the group consisting of naphthyl, dihalogen substituted phenyl, trihalogen substituted phenyl, halogen substituted naphthyl and

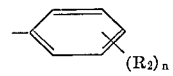

where $n$ represents an integer selected from the group consisting of 1 to 3, $R_2$ is a member selected from the group consisting of lower alkoxy, phenyl and lower alkylphenyl, and where halogen is selected from the group consisting of chlorine and bromine; and X represents the anion of an acid selected from the group consisting of hydrochloric acid, sulfuric acid and p-toluene sulfonic acid.

4. N-dodecyl-N,N-dimethyl - N - [3 - (2',4' - dichlorophenoxy)-2-hydroxy-propyl]-ammonium chloride.

5. N-dodecyl-N,N-dimethyl - N - [3-(2',4',5'-trichlorophenoxy)-2-hydroxy-propyl]-ammonium chloride.

6. N-dodecyl-N,N-dimethyl - N - (3 - phenylthio - 2-hydroxy-propyl)-ammonium chloride.

7. N-3-(dodecyloxy)-propyl-N,N - dimethyl - N - [3-(4' - chlorophenoxy) - 2-hydroxy - propyl] - ammonium chloride.

8. N-hexadecyl-N,N-dimethyl-N-[3 - (2',4',6' - trichlorophenoxy)-2-hydroxy-propyl]-ammonium chloride.

9. N - dodecyl - N,N - dimethyl - N - [3 - (2' - phenylphenoxy)-2-hydroxy-propyl]-ammonium chloride.

10. N-dodecyl-N,N-dimethyl-N-[3 - (2' - naphthoxy)-2-hydroxy-propyl]-ammonium chloride.

11. N-tetradecyl-N,N-dimethyl-N-[3-(1' - naphthoxy)-2-hydroxy-propyl]-ammonium chloride.

12. N-dodecyl-N,N-dimethyl-N-[3 - (2' - methoxyphenoxy)-2-hydroxy-propyl]-ammonium chloride.

13. N-dodecyl-N,N-dimethyl-N - [3 - (2' - benzyl - 4-chlorophenoxy)-2-hydroxy-propyl]ammonium chloride.

References Cited

UNITED STATES PATENTS

| | | | |
|---|---|---|---|
| 2,547,965 | 4/1957 | Olin | 260—567.6 |
| 2,951,787 | 9/1960 | Cicero et al. | 167—30 |
| 2,951,788 | 9/1960 | Lo et al. | 167—30 |
| 2,957,006 | 10/1960 | Arnold et al. | 260—567.6 X |
| 3,077,472 | 2/1963 | Burckhalter | 260—567.6 X |
| 3,104,933 | 9/1963 | Mendelsohn et al. | 8—55 |
| 3,123,641 | 3/1964 | Longley | 260—567.6 |

OTHER REFERENCES

Chem. et al.: "Chemical Abstracts," vol. 56, pp. 7189–90 (1962).

Tanaka: "Chemical Abstracts," vol. 45, pp. 5099–5100 (1951).

CHARLES B. PARKER, *Primary Examiner.*

ROBERT V. HINES, *Assistant Examiner.*